United States Patent Office 3,740,339
Patented June 19, 1973

3,740,339
DETERGENT FORMULATION CONTAINING CURED 6-CARBOXY CELLULOSE AS A SEQUESTRANT
Donald M. MacDonald, Monroe, N.Y., assignor to International Paper Company, New York, N.Y.
No Drawing. Filed June 28, 1971, Ser. No. 157,616
Int. Cl. C02b 5/06; C08b 15/04; C11d 3/22
U.S. Cl. 252—135
8 Claims

ABSTRACT OF THE DISCLOSURE

The elimination of phosphorus-containing compounds from detergent formulations, which cause water pollution, and their replacement with non-phosphorus-containing compounds of equal efficacy is achieved by employing the cured product of the reaction between 6-carboxy cellulose and an aqueous solution of a Lewis acid catalyst.

---

The present invention relates to a product which can be used in a detergent formulation to replace sodium tripolyphosphate. More particularly, it relates to a non-phosphorus-containing composition, and the process of its manufacture, as a calcium and magnesium ion sequestrant in a detergent formulation.

Modern detergents are intimate mixtures of several components including a surfactant, a soil suspension agent, a calcium and magnesium ion sequestering agent and, optionally, inorganic salts as fillers, optical brighteners and bleach crystals. The surfactant usually is an alkyl or alkylaryl sulfonate, though other anionic, nonionic or cationic surfactants may be used. Carboxymethyl cellulose is the soil suspending agent in most detergents. Sodium tripolyphosphate is the calcium and magnesium ion sequestering material. It also serves as a buffer insuring a moderately alkaline pH for optimum detergency. Sodium silicate is the most common optional filler and, because it inhibits corrosion of washing machines, its use is becoming general in detergents.

Replacement of sodium tripolyphosphate is necessary because of ecological considerations. Phosphorus is an essential nutrient for living organisms along with nitrogen and carbon. Polyphosphate in effluent waters is converted by hydrolysis to phosphate ion. Phosphate ion is an efficient source of nutrient phosphorus. If the effluent water contains a biological excess of carbon and nitrogen, phosphorus becomes the controlling element for microorganism growth. Where the concentration of all three elements is high, algae growth occurs rapidly and the waters become fouled by a green scum. This has occurred to many lakes in developed regions throughout the world.

How often phosphorus is the growth controlling element is questionable, although cases have been documented where it is and lake fouling has occurred. Up to 60% of this phosphorus comes from detergent polyphosphate; the remainder comes from fertilizers and other sources. Thus it is desirable that phosphorus should be eliminated from detergents.

Natural hard waters contain large amounts of dissolved carbon dioxide. At the alkaline pH values necessary for detergency, calcium and magnesium carbonates will precipitate. These precipitates lead to greying of white fabrics. Detergency is also harmed by their presence and so a means of keeping calcium and magnesium ions in solution is required. The ability of the ions to adversely interact with the surface active detergent component must also be destroyed.

Precipitation of calcium and magnesium carbonates does not occur in the presence of sodium tripolyphosphate. This can be demonstrated by adding a mixture of sodium carbonate and sodium tripolyphosphate to a synthetic source of hard water such as is described in U.S. Federal Specification P–D–245a. The magnesium and calcium carbonate precipitate does not form. Sodium tripolyphosphate also prevents the adverse action of calcium and magnesium ion on the surface active component and it supplies the alkalinity necessary for good detergency.

Prevention of the precipitation of carbonates by sodium tripolyphosphate and elimination of the adverse effect of calcium and magnesium ions on detergency is known to be due to the chelating action of sodium tripolyphosphate. In simplest terms, this means the calcium and magnesium ions are surrounded and rendered incapable of forming insoluble carbonates or of harming detergent action by the tripolyphosphate molecule in the form of a claw.

Accordingly, it is an object of the present invention to provide a sequestrant which does not contain phosphorus and a process for the manufacture of said sequestrant.

It is another object of the present invention to provide a washing composition which is free of phosphorus-containing compounds, but which possesses the advantages of polyphosphate compounds.

It is yet another object of the present invention to provide a non-phosphorus-containing compound whose sequestering activity is non-permanent and which decomposes quickly after completion of washing.

Additional objects will become apparent from a consideration of the following detailed description of the invention.

It has been found in accordance with the present invention that a phosphorus-containing sequestrant, particularly sodium tripolyphosphate, can be completely eliminated from detergent systems and results comparable to those attained by using a polyphosphate are achieved by utilizing as a sequestrant the heat cured reaction product of 6-carboxy cellulose and an aqueous solution of a Lewis acid catalyst in a detergent washing system.

6-carboxy cellulose itself, which has not been treated in accordance with the present invention, has been recognized as a soil suspending agent useful in detergents. However, it cannot sequester calcium or magnesium. This can be readily demonstrated by the addition of sodium carbonate and 6-carboxy cellulose to water-containing magnesium and calcium ion. A convenient synthetic source of such water is the 300 p.p.m. synthetic hard water described in U.S. Federal Specification P–D–245a. When carbonate ion is added to this water, a white or grey cloudy precipitate forms in a minute or two. If 6-carboxy cellulose is present and sufficient sodium carbonate is added to maintain alkaline pH values, above pH 8.5 or 9.0, the 6-carboxy cellulose will dissolve and the cloudy precipitate will still form. The precipitate can be isolated by centrifugation and identified as a mixture of calcium and magnesium carbonates by conventional means.

However, it has been found that the Lewis acid treated 6-carboxy cellulose after heat curing, which is the product of the present invention, prevents precipitate formation for periods of time which are sufficient to complete the washing cycle.

The 6-carboxy cellulose used in this invention is conveniently produced by nitrogen dioxide oxidation of cellulose. This process is well known and carried out by whatever means is convenient and economic. Thus, gaseous or liquid $NO_2$ can be used and a solvent is optional. The choice of the cellulose starting material is also dictated by convenience. Cotton, cotton linters, regenerated cellulose or wood pulp may be used. Because of economic factors, bleached wood pulp is preferred.

The oxidation of cellulose by nitrogen dioxide can be interrupted at any stage to give a product containing almost no carboxyl to one containing 25.6% carboxyl. Each $C_6$ carbon atom is in the form of a carboxyl group when 25.6% carboxyl is present. Carboxyl is conveniently measured by the calcium acetate method developed by Yackel and Kenyon, Journal of the American Chemical Soc., 1942, 64, 121–127. This method is not strictly accurate at the highest carboxyl levels. At these levels it measures calcium ion accessibility, which is an excellent practical result for present purposes.

The carboxyl content of the 6-carboxy cellulose used in accordance with the present invention can be from about 12% to about 25.6%, with from about 19% to 25.6% being preferred. As carboxyl ion is involved in the calcium and magnesium sequestering process, the higher the carboxyl level the better the results achieved and, therefore, the use of a 6-carboxy cellulose having a 25.6% carboxyl content is especially preferred.

While oxidation with nitrogen dioxide is referred to, it should be noted that any related method giving predominate attack at the $C_6$ position on the anhydroglucose unit is not excluded for preparation of 6-carboxy cellulose. An example of such a process is oxidation of cellulose by a mixture of nitric acid and sodium nitrite.

The Lewis acid used as a catalyst for converting the 6-carboxy cellulose into a calcium and magnesium sequestering or chelating agent can be selected from the group consisting of hydrated and unhydrated magnesium salts of mineral acids, aluminum salts of mineral acids, acetic acid, zinc salts of mineral acids, boron trifluoride and zinc fluoborate. It is preferred to employ either magnesium chloride or magnesium nitrate. Magnesium nitrate is especially preferred because after it reacts with the 6-carboxy cellulose and is heat cured, the cured 6-carboxy cellulose is less highly colored in solution than when magnesium chloride is used.

In preparing the sequestrant of the present invention, 6-carboxy cellulose is soaked in an aqueous Lewis acid catalyst solution. The time of soaking or steeping is immaterial, provided that sufficient time is available to thoroughly and uniformly wet out and contact the 6-carboxy cellulose with the catalyst solution. The concentration of 6-carboxy cellulose is also immaterial, provided again that it is not so high that uniform wetting and contact with catalyst is impossible. Thus, with highly efficient mixing equipment 50% or more 6-carboxy cellulose can be used. At this level filtration of excess buffer solution would be unnecessary. The lower limit for 6-carboxy cellulose concentration is set simply by convenience. Too little 6-carboxy cellulose requires mixing large volumes of catalyst solution and filtration of these large volumes at the end of steeping. About 4% of 6-carboxy cellulose is preferred, since this amount does not require excessive volumes of catalyst solution, is easy to disperse and thoroughly wet out, and the excess is readily filtered.

The concentration of the catalyst in the steeping solution can be from about 0.1% to about 60.0%, by weight, preferably from about 1.0% to about 20.0%. Desirably, however, the catalyst concentration, especially when magnesium salts of mineral acids are being used, should be kept as low as possible in the steeping solution. This is simply because the magnesium ion from the catalyst must be sequestered, thus leaving a reduced amount of sequestering capacity for removing the calcium and magnesium ions from hard water and from soil. Accordingly, it is especially preferred to employ about 4%, by weight, of the catalyst in a steeping solution containing 4%, by weight, of 6-carboxy cellulose, resulting in a 1:1 ratio of catalyst to 6-carboxy cellulose in said steeping solution.

The time of cure is directly related to the efficiency of heating. Accordingly, the cure temperature can be anywhere from 100° C. to about 200° C. and the curing time can be anywhere from one minute to about 24 hours. A very long time should be avoided, if possible, as an excessively colored product is obtained. It is preferred to cure at a temperature of from about 140° C. to about 160° C. with a temperature of 150° C. being especially preferred. When cure is effected at a temperature of from about 140° C. to about 160° C., when employing 4.0% of magnesium nitrate in a steeping solution containing 4.0% of 6-carboxy cellulose, it is preferred to cure for from about 10 minutes to about 20 minutes, with 15 minutes being especially preferred. When curing at 140° C. and above for periods in excess of one hour a highly colored product is obtained, which would, when employed in a detergent formulation, blacken the wash water. When low cure temperatures are employed much longer times for effecting cure are necessary, even as much as 24 hours if the concentration of the catalyst is low or if it is entirely absent. It has been noted that even in the absence of a Lewis acid catalyst a small amount of calcium sequestering ability is observed after curing the 6-carboxy cellulose for 16 hours at 105° C. It has also been noted that sequestering ability is not developed at 150° C. in the absence of a catalyst; decomposition and an unacceptable color occur instead.

After steeping, the excess catalyst solution is removed by filtration, centrifugation or any other convenient means, and the 6-carboxy cellulose containing the physically adsorbed catalyst can, optionally, be dried, or directly cured in the wet state with provision for the removal of water vapor. When cured from the wet state, the time necessary for effecting cure increases. If drying is used prior to curing, this can be done at about 105° C. for a period of from about 30 to about 45 minutes in a forced draft oven.

The cured 6-carboxy cellulose is converted into a powder by grinding. To provide a detergent composition of suitable alkalinity and buffering capacity, the cured 6-carboxy cellulose is mixed with an alkaline salt or salts, to give a 1% solution of the detergent composition a pH of from about 7.0 to about 11.5, preferably from about 9.0 to about 10.6. Exemplary of the alkaline salts which can be used are: sodium silicate, sodium sesquicarbonate, sodium carbonate, potassium silicate, potassium carbonate, sodium borate, sodium acetate and mixtures thereof. The alkaline salt or mixtures thereof can constitute from about 30% to about 75% of the detergent composition.

The surfactant or surface active agent employed in the detergent composition can be anionic, cationic, nonionic, ampholytic, zwitterionic, or any suitable mixture of two or more of these. The ratio of surfactant to the mixture of cured 6-carboxy cellulose and the alkaline salt(s), which together can be considered to form a detergent builder, can be from about 1:10 to about 3:1, by weight.

In addition, carboxymethyl cellulose, which is a soil suspending agent, fillers, optical brighteners, etc., can be added.

EXAMPLE 1

In this example, 6-carboxy cellulose of 21.4% carboxyl content was stirred with various catalyst solutions, filtered, dried at 105° C. in a forced draft oven and cured for 15 minutes, also in a forced draft oven. The cured products were powdered in a Wiley mill and 0.96 g. of the resulting powder was mixed with 2.17 g. of sodium carbonate. The mixtures were stirred for 20 minutes in 200 mls. of the 300 p.p.m. hardness water described in U.S. Federal Specification P–D–245a. Two water temperatures were used, 65° C. and 25° C. After stirring, solids were removed by centrifugation and washed two times with 50 g. portions of distilled water to remove traces of sodium carbonate. After decanting the last wash, the precipitates were treated with concentrated hydrochloric acid and the gas evolution observed. This distinguishes between precipitated carbonates and any residual insoluble 6-carboxy cellulose.

TABLE I

| Catalyst type | Percent catalyst in steeping solution | Cure temp. (° C.) | Test temp. (° C.) | Precipitate in hard water | Gas evolution |
|---|---|---|---|---|---|
| MgCl$_2$·6H$_2$O | 21.5 | 140 | 65 | − | − |
| MgCl$_2$·6H$_2$O | 21.5 | 140 | 25 | − | − |
| Acetic acid | 10 | 140 | 65 | + | + |
| Do | 10 | 140 | 25 | − | − |
| Do | 10 | 120 | 65 | + | + |
| Do | 10 | 120 | 25 | + | + |
| NH$_4$Cl | 10 | 120 | 65 | + | + |
| NH$_4$Cl | 10 | 120 | 25 | + | + |
| NH$_4$NO$_3$ | 10 | 120 | 65 | + | + |
| NH$_4$NO$_3$ | 10 | 120 | 25 | + | + |
| NH$_4$NO$_3$ | 1 | 140 | 65 | + | + |
| NH$_4$NO$_3$ | 1 | 140 | 25 | + | + |
| Ca(SCN)$_2$ | 3 | 120 | 65 | + | + |

The results in Table I illustrate the good behavior resulting from use of the magnesium chloride catalyst compared to the other catalysts tried. Acetic acid sequestered the hard water ions only at 25° C. Calcium thiocyanate was tried since it is known to strongly decrystallize cellulose. It was unsuccessful. Decrystallization involves a loss of order in the arrangement in space of the 6-carboxy cellulose molecules. This could cause a more facile rearrangement of the molecules into their active, calcium sequestering form.

EXAMPLE 2

The effects of variables in production of the sequestering material are given next, using absence of precipitation and absence of gas evolution as a criterion for the ability to sequester. The 300 p.p.m. hard water was the same as that used in Example 1. Tests for precipitation and carbon dioxide evolution were also carried out as in Example 1. The non-permanent nature of the sequestrant is illustrated by precipitate formation on standing. When a precipitate formed on standing, it always liberated CO$_2$ gas after centrifugation, washing and treatment with concentrated hydrochloric acid. Sufficient Na$_2$CO$_3$ was added in each case to give a pH of 10.2–10.4 to the hard water.

TABLE II

| Percent arboxyl | Percent Mg(NO$_3$)$_2$·6H$_2$O in steep | Cure temp. (° C.) | Cure time (min.) | Grams cured 6-carboxy cellulose | Test Temp. (° C.) | Ppt. during test | Gas evolution | Ppt. on standing |
|---|---|---|---|---|---|---|---|---|
| 19.9 | 10 | 110 | 15 | 0.96 | 65 | − | − | + |
| 14.3 | 10 | 110 | 15 | 0.96 | 25 | + | + | |
| 21.4 | 3 | 120 | 15 | 0.96 | 25 | − | − | − |
| 21.4 | 3 | 120 | 15 | 0.48 | 25 | − | − | + |
| 21.4 | 3 | 120 | 15 | 0.24 | 25 | − | − | + |
| 21.4 | 3 | 120 | 15 | 0.12 | 25 | − | − | + |
| 21.4 | 3 | 120 | 15 | 0.96 | 65 | − | − | + |
| 21.4 | 3 | 120 | 10–20 | 0.48 | 65 | + | + | |
| 19.9 | 3 | 120 | 15 | 0.96 | 65 | + | + | |
| 19.9 | 3 | 120 | 15 | 0.96 | 25 | − | − | − |
| 14.3 | 2–4 | 120 | 15 | 0.96 | 65 | + | + | |
| 14.3 | 3 | 120 | 15 | 0.96 | 25 | − | − | − |
| 14.3 | 2 | 150 | 15 | 0.48 | 65 | + | + | |
| 14.3 | 4 | 150 | 15 | 0.48 | 65 | − | − | |
| 14.3 | 3 | 160 | 15 | 0.48 | 65 | + | + | |
| 14.3 | 4 | 160 | 15 | 0.48 | 65 | − | − | − |
| 21.4 | 4 | 150 | 15 | 0.24 | 65 | − | − | + |
| 21.4 | 4 | 150 | 15 | 0.12 | 65 | (¹) | | + |
| 21.4 | 4 | 150 | 15 | 0.12 | 25 | − | − | − |

¹ Haze.

This table illustrates the excellent sequestering power found at a hard water temperature of 25° C. in almost every case. Sequestering in 65° C. water is more difficult. 4% catalyst and high cure temperature is required for good 65° C. sequestering ability.

The concentration of the sequestrant of the present invention which would be used in a home washing machine lies between the 0.12 g. and the 0.24 g. levels in Table II above. In a hot water wash, where the water temperature would rarely be higher than 65° C., or times longer than 20 minutes, a 150° C., 15 minute cure is optimum.

EXAMPLE 3

In the experiments listed below in Table III, the cured 6-carboxy cellulose, in each instance, contained 21.4% carboxyl, it was steeped in an aqueous solution containing 4% of Mg(NO$_3$)$_2$·6H$_2$O, and was cured at 150° C. for 15 minutes.

The mixed carbonates precipitation test outlined in Example 1 was used to compare the sequestrant of the present invention, cured 6-carboxy cellulose, with other sequestrants.

TABLE III

| Sequestering agent | Weight (g.) | Test temp. (° C.) | Ppt. during test | Gas evolution | Ppt. on standing |
|---|---|---|---|---|---|
| Gluconic acid | 0.96 | 65 | + | + | |
| Do | 0.96 | 25 | + | + | |
| Citric acid | 0.96 | 65 | + | + | |
| Do | 0.96 | 25 | + | + | |
| Diglycollic acid | 0.96 | 65 | + | + | |
| Nitrilo triacetate | 0.24 | 65 | − | − | − |
| Do | 0.12 | 65 | +¹ | − | + |
| Sodium tripolyphosphate | 0.96 | 25 & 65 | − | − | − |
| Do | 0.24 | 25 & 65 | − | − | − |
| Do | 0.12 | 25 & 65 | (²) | | + |
| Cured 6-carboxy cellulose | 0.24 | 25 & 65 | − | − | + |
| Do | 0.12 | 25 | − | − | − |
| Do | 0.12 | 65 | (²) | | + |

¹ Slight. ² Haze.

Obviously the sequestrant of the present invention is a more efficient sequestering agent for Mg$^{++}$ and Ca$^{++}$ ions in hard water than gluconic, citric or diglycollic acids, and is equally as good a sequestrant as sodium tripolyphosphate or nitrilo triacetate, which increases pollution in waters where nitrogen is the growth controlling element.

EXAMPLE 4

A cured, powdered 6-carboxy cellulose having a carboxyl content of 21.4%, as measured by the calcium acetate procedure of Yackel and Kenyon, J.A.C.S., 1942, vol. 64, pp. 121–127, was prepared by steeping the 6-carboxy cellulose in an aqueous solution containing 4% Mg(NO$_3$)$_2$·6H$_2$O until the 6-carboxy cellulose was wetted out, and was then cured for 15 minutes at 150° C. in a forced draft oven. The product was then used in compounding detergent formulations. In each experiment the organic surfactant in the detergent formulation was a sodium linear alkylate sulfonate. The formulations were compared with a tripolyphosphate-containing formulation for their soil removal ability.

Standard soiled white cotton cloth (U.S. Testing Company) was used in all tests. The total color difference ΔE between the cloth and a white ceramic standard was measured before and after laundering. Results are expressed as the difference in total color before and after laundering.

A Hunter color difference meter, Model D–25, was used with the white ceramic standard. Measurements were made to determine the lightness L of the cloth and, in addition, the red and green color factor $a$ and the yellowness or blueness factor *b* were determined. The total color difference from the white standard was calculated for both sides of each cloth sample by the equation:

$$\Delta E = \sqrt{(\Delta L)^2 + (\Delta a)^2 + (\Delta b)^2}$$

ΔL is the difference in lightness between the white ceramic standard and the sample.
Δa is the difference in the red and green color factor between the white ceramic standard and the sample.
Δb is the difference in the yellow and blue color factor between the white ceramic standard and the control.

Then the loss in total color difference ΔC caused by laundering of one side of the cloth sample is found from the equation:

$$\Delta C = \Delta E_o - \Delta E_f$$

where $\Delta E_o$ and $\Delta E_f$ are the color differences between the cloth and the white ceramic standard before and after laundering respectively. As the cotton cloth was white before soiling, ΔC is a measure of the soil removed. The values for each side were averaged and results given as averages for the two sides of each sample.

After preparation and blending of the detergent mixtures, 0.30 g. of each was added to 200 ml. portions of 65° C., 150 p.p.m. synthetic hard water in Launderometer jars. The 150 p.p.m. water was prepared simply by diluting the water used in Examples 1 to 3 with an equal volume of distilled water. The Launderometer jars contained 100 ¼" diameter steel balls. The jars were rotated in the Launderometer at 65° C. for 10 minutes, the supernatent liquid drained off and two rinses with 150 p.p.m. water (200 ml.) was carried out. Three minutes were required for each rinse. Then a fresh 0.30 g. of detergent and fresh 150 p.p.m. hard water was added and the wash cycle and two rinses were repeated. After a third wash with a third 0.30 g. detergent mixture followed by the two rinses, always with 65° C., 150 p.p.m. hard water, the cloths were squeezed to remove as much water as possible, blotted on pulp sheets and dried in a 105° C. forced draft oven for 15 minutes. ΔC, the color difference due to laundering, measures soil removal. The higher the value of ΔC, the better is the soil removal.

TABLE IV

| Surfactant | Carboxy-methyl cellulose | [Cured 6-carboxy cellulose | Sodium tripoly-phosphate | Sodium silicate penta-hydrate | Sodium sulfate | Sodium carbonate | Grams mixture used | pH after washing | Color difference ΔC |
|---|---|---|---|---|---|---|---|---|---|
| 20 | 1 | 24.2 | | 12.0 | | 42.8 | 0.30 | 10.0 | 5.37 |
| 20 | 1 | 39.5 | | 12.0 | | 27.5 | 0.30 | 9.5 | 5.31 |
| 20 | 1 | 31.9 | | 12.0 | | 35.1 | 0.30 | 9.8 | 5.03 |
| 20 | 1 | | 50.0 | 12.0 | 17.0 | | 0.30 | 10.3 | 6.06 |
| 27.0 | 1.3 | 32.5 | | 16.1 | | 23.1 | 0.30 | 9.7 | 6.91 |
| 19.1 | 0.9 | 37.6 | | 11.4 | | 31.0 | 0.30 | 9.7 | 5.86 |
| 22.3 | 1.0 | 35.5 | | 13.4 | | 27.8 | 0.30 | 9.7 | 6.50 |

It is evident from the above results that the cured 6-carboxy cellulose of the present invention removes soil at least as well as sodium tripolyphosphate.

EXAMPLE 5

In this example, additional soil removal test results are given. Less sodium silicate was used in these test formulations than in those outlined in Example 4. Results are given for tests run using 0.125 and 0.25% detergent mixture in the 150 p.p.m. hard water. The sequestering material, surfactant, laundering test procedure and measurement of ΔC, the color difference due to laundering, were identical to those used in Example 4.

TABLE V

| Surfactant | Carboxy-methyl cellulose | Cured 6-carboxy cellulose | Sodium tripoly-phosphate | Sodium silicate penta-hydrate | Sodium sulfate | Sodium carbonate | Grams mixture used | pH after washing | Color difference ΔC |
|---|---|---|---|---|---|---|---|---|---|
| 20.0 | 1.0 | | 40.0 | 5.0 | 34.0 | | 0.25 | 9.6 | 4.47 |
| 20.0 | 1.0 | 24.2 | | 5.0 | | 49.8 | 0.25 | 10.1 | 5.90 |
| 20.0 | 1.0 | | 40.0 | 5.0 | 34.0 | | 0.50 | 10.2 | 10.14 |
| 20.0 | 1.0 | 24.2 | | 5.0 | | 49.8 | 0.50 | 10.2 | 7.54 |
| 20.0 | 1.0 | 39.5 | | 5.0 | | 34.5 | 0.25 | 9.7 | 4.84 |
| 20.0 | 1.0 | 39.5 | | 5.0 | | 34.5 | 0.50 | 9.6 | 7.37 |
| 20.0 | 1.0 | 31.9 | | 5.0 | | 42.1 | 0.25 | 10.2 | 5.20 |
| 20.0 | 1.0 | 31.9 | | 5.0 | | 42.1 | 0.50 | 10.0 | 8.06 |

In these tests, cured 6-carboxy cellulose was distinctly better than sodium tripolyphosphate when 0.250 g. of detergent mixture was used in the test. As 200 ml. of water are used in each laundering stage, 0.250 g. detergent mixture corresponds to 0.125% detergent in the wash. This is close to 0.12–0.18%, the amounts often recommended by detergent manufacturers for home laundry use for tripolyphosphate-containing detergents.

What is claimed is:

1. A detergent composition consisting essentially of an organic surfactant selected from the group consisting of anionic, cationic, nonionic, ampholytic and zwitterionic surfactants, and mixtures thereof, an alkaline salt selected from the group consisting of sodium silicate, sodium sesquicarbonate, sodium carbonate, potassium silicate, potassium carbonate, sodium borate, sodium acetate and mixtures thereof, and as a sequestrant for calcium and magnesium ions the heat cured product obtained from the reaction at from about 100° C. to about 200° C. for a period of from about 1 minute to about 24 hours between 6-carboxy cellulose, having a carboxyl content of from about 12.0% to about 25.6% by weight of said 6-carboxy cellulose, and an aqueous Lewis acid catalyst solution containing from about 0.1% to about 60% of a Lewis acid catalyst, the percentage of the catalyst being based upon the weight of the catalyts in the solution, said Lewis acid catalyst being selected from the group consisting of hydrated and unhydrated magnesium salts of mineral acids, aluminum salts of mineral acids, acetic acid, zinc salts of mineral acids; boron trifluoride and zinc fluoborate, the ratio by weight of the surfactant to the sequestrant plus the alkaline salt being from about 1:10 to about 3:1.

2. The composition of claim 1 wherein said 6-carboxy cellulose has a carboxyl content of 25.6%.

3. The composition of claim 1 wherein said Lewis acid is selected from the group consisting of magnesium nitrate and magnesium chloride.

4. The composition of claim 1 wherein the Lewis acid is magnesium nitrate hexahydrate whose aqueous concentration is about 4.0%, by weight.

5. The composition of claim 1 wherein a 1% solution has a pH of from about 7.0 to about 11.5.

6. The composition of claim 1 wherein a 1% solution has a pH of from about 9.0 to about 10.6.

7. The composition of claim 1 wherein the heat cure is effected at from about 140° C. to about 160° C. for a period of from about 10 minutes to 20 minutes.

8. The composition of claim 1 wherein the alkaline salts comprise from about 30% to about 75%, by weight, of the detergent composition.

References Cited
UNITED STATES PATENTS

| | | | |
|---|---|---|---|
| 3,665,000 | 5/1972 | Hills et al. | 260—333.3 R |
| 3,629,121 | 12/1971 | Eldib | 252—89 |
| 3,111,513 | 11/1963 | Battista | 260—212 |
| 2,894,945 | 7/1959 | Hofreiter et al. | 260—333.3 |
| 2,758,112 | 8/1956 | Waning | 260—212 |
| 2,753,337 | 7/1956 | Klug | 260—215 |
| 2,589,190 | 3/1952 | Hanson | 252—130 X |
| 2,448,892 | 9/1948 | Kenyon et al. | 260—212 X |
| 2,335,194 | 11/1943 | Nüsslein et al. | 252—545 X |

LEON D. ROSDOL, Primary Examiner

D. L. ALBRECHT, Assistant Examiner

U.S. Cl. X.R.

252—89, 132, 180, 539, DIG. 2 and 11; 260—212, 227, 232